Figure 1:
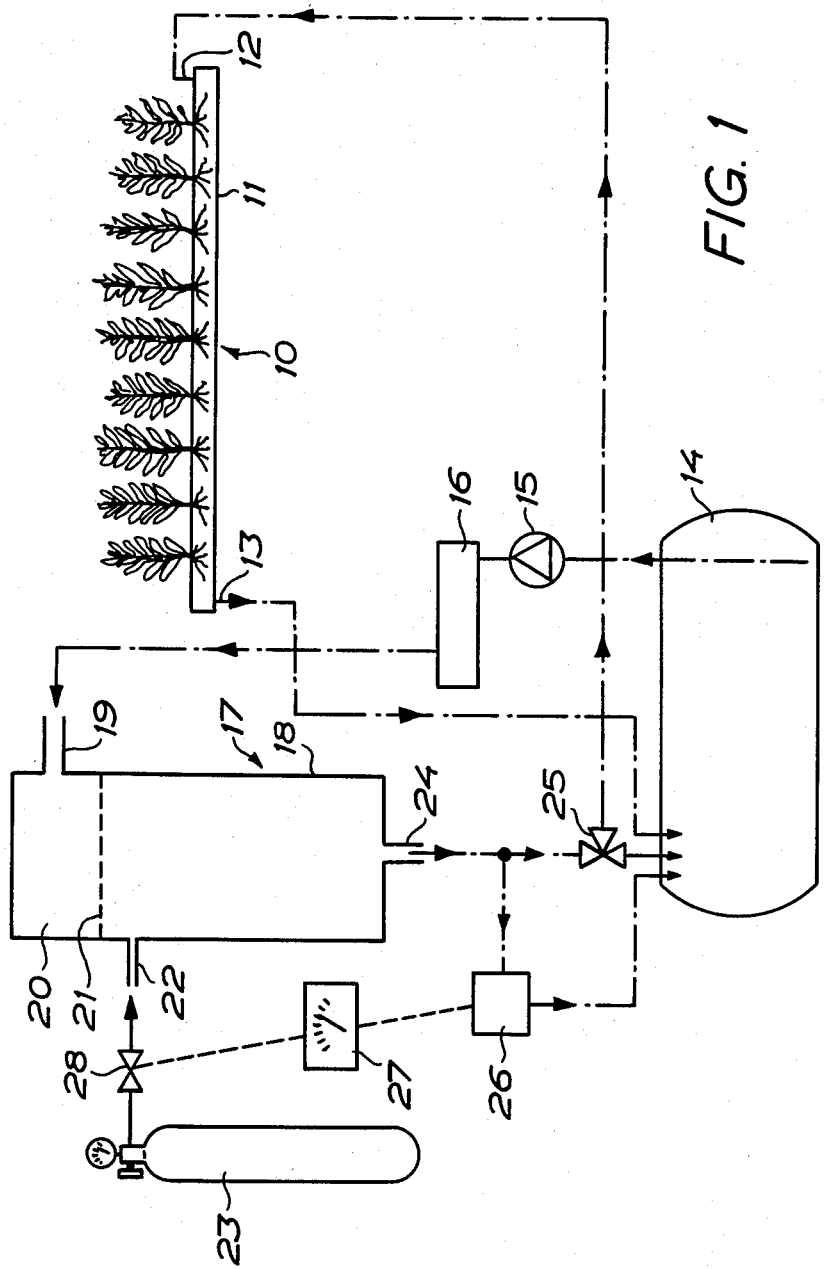

United States Patent [19]

Sjöstedt

[11] Patent Number: 4,488,377
[45] Date of Patent: Dec. 18, 1984

[54] METHOD OF CULTIVATING PLANTS WITHOUT SOIL

[76] Inventor: Ernst H. S. Sjöstedt, P.O. Box 4212, S-260 73 Östra Ljungby, Sweden

[21] Appl. No.: 494,142
[22] PCT Filed: Jan. 12, 1981
[86] PCT No.: PCT/SE81/00004
§ 371 Date: Sep. 10, 1981
§ 102(e) Date: Sep. 10, 1981
[87] PCT Pub. No.: WO81/01940
PCT Pub. Date: Jul. 23, 1981

Related U.S. Application Data

[63] Continuation of Ser. No. 302,411, Sep. 10, 1981, abandoned.

[30] Foreign Application Priority Data

Jan. 11, 1980 [SE] Sweden ............................... 8000232

[51] Int. Cl.³ .............................................. A01G 31/00
[52] U.S. Cl. ........................................... 47/59; 47/1.4
[58] Field of Search ........................................ 47/59–65, 47/1.4

[56] References Cited

U.S. PATENT DOCUMENTS 3,103,763  9/1963  Malchair .................................. 47/62
4,302,906  12/1981  Kawabe et al. ........................ 47/62

OTHER PUBLICATIONS

Soilless Growth of Plants, Ellis et al., 1947, Reinhold Publ. Corp., N.Y, pp. 47–48.
Studies on the . . . , Allison et al., 1923, Amer. Journ. of Botany, Dec., pp. 554–566, 47–62.
The Grower, Nov. 4, 1976, pp. 971–975.

Primary Examiner—Robert E Bagwill
Attorney, Agent, or Firm—Finnegan, Henderson, Farabow, Garrett & Dunner

[57] ABSTRACT

A method of cultivating plants without soil, wherein a nutrient solution is supplied to the root system of the plants.

Before the nutrient solution is supplied to the root system it is oxidized with substantially pure oxygen to maintain a content of dissolved oxygen at the root system which is at least 4 ppm.

3 Claims, 3 Drawing Figures

METHOD OF CULTIVATING PLANTS WITHOUT SOIL

This application is a continuation of application Ser. No. 302,411, filed Sept. 10, 1981 now abandoned.

The invention relates to a method of cultivating plants without soil, wherein the nutrient solution is supplied to the root system of the plants.

In all cultivation, whether it takes place in earth or soil in the conventional manner or in a nutrient solution which is supplied to the root system of the plants, the taking up of negative ions (anions) by the plants takes place primarily by means of the energy which is released on respiration by the roots. Since oxygen is used for normal root respiration, a high oxygen content in the soil water or nutrient solution is of great importance for supplying the plant with the necessary nutrients. In this connection reference may be made to an article by H. Marschner: Einfluss der Sauerstoff-Versorgung der Wurzeln auf Mineralstoffaufnahme und Pflanzenwachstum, KALI-BRIEFE, Fachgebiet 2,2. Folge: 1–17, 1976.

The connection between the root respiration and the absorption of negative ions can often be observed in the practical cultivation of plants. For example, if the roots of young tomato plants suffer from a lack of oxygen because of too low an oxygen content in the soil water or nutrient solution, the root respiration becomes more difficult and hence the ion absorption in general and particularly the absorption of nitrate ions. The plants turn yellow and show distinct symptoms of a nitrogen shortage.

In the cultivation of plants without soil, more attention has been paid to the importance of root respiration for the production of the plants. At the beginning of the culture there is sufficient oxygen for the young roots, and the root respiration then works well but gradually, as the plants become older, a certain amount of root death occurs as the plants renew their roots and the old ones die off. These dead roots then use up some of the oxygen which is available in the nutrient solution, since oxygen is used in the decomposition of these dead roots so that the oxygen content in the nutrient solution which is available for the active roots, is reduced. The reduced supply of oxygen in the nutrient solution can lead to the fact that the root respiration becomes inadequate and a certain tendency towards root death can then be observed, with the result that further dead roots now come to use up further oxygen in one nutrient solution.

It is also known that the absorption of ammonium ions $NH_4^+$ by the roots leads to a lowering of the pH value of the nutrient solution because the roots then give off hydrogen ions $H^+$. Bacteria in the nutrient solution (nitrification bacteria) also reduce the ammonium to nitrate using up oxygen in accordance with the following:

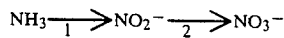

1. 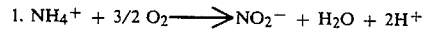

2. 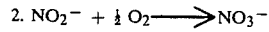

1 and 2 together give

The physiological mechanisms described mean that the cultivation enters a vicious circle in which the oxygen which is supplied to the root system of the plants through the nutrient solution is used otherwise than to the advantage of absorption of nutrient by the plants.

In the cultivation of plants without soil, in order to introduce oxygen into the nutrient solution, air was previously blown into this through a perforated pipeline or hose in a supply tank for the nutrient solution, using compressors. This is described, for example, in the Swedish laid-open specification No. 7510385-3. The oxygen content of the nutrient solution which is brought about in this manner is not sufficient, however, to supply the oxygen which is needed.

With knowledge of the circumstances related above, the object of the invention is to provide optimum conditions for the plants during cultivation without soil with the supply of nutrient solution regarding root respiration and nutrient absorption by the plants and so to increase the production of the plants.

Figure 2:
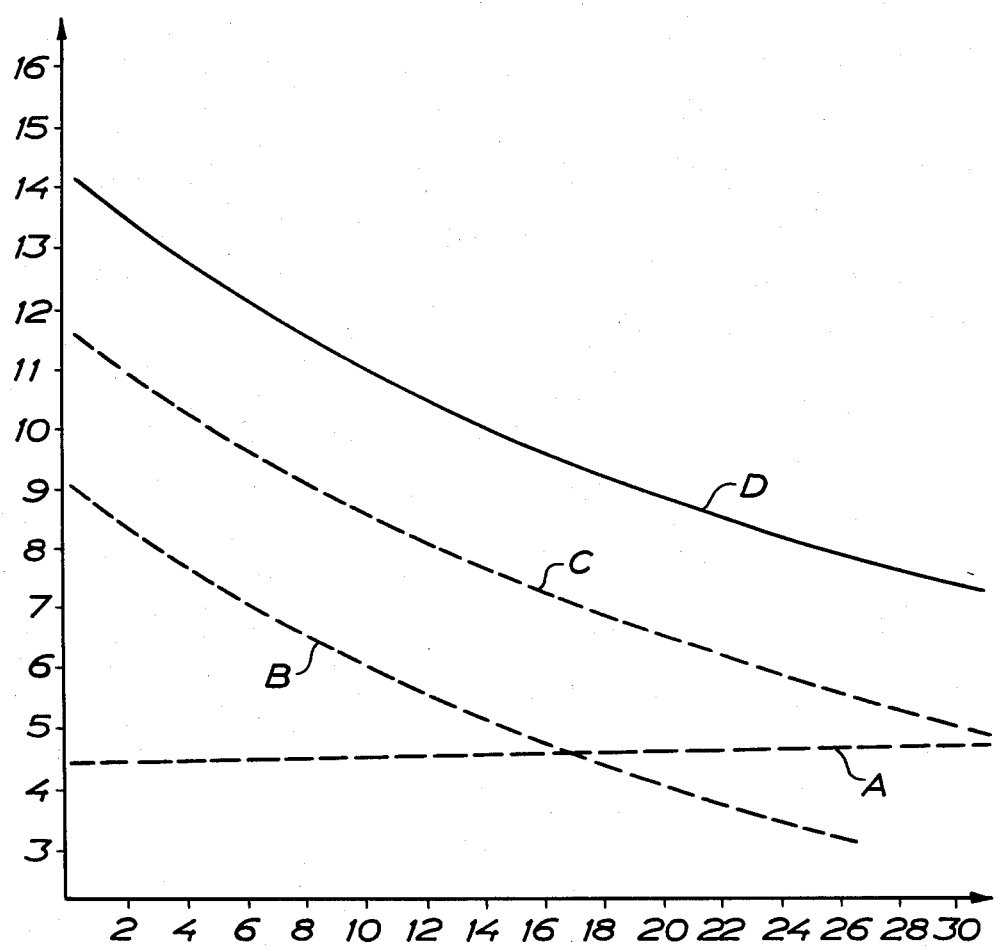
Figure 3:
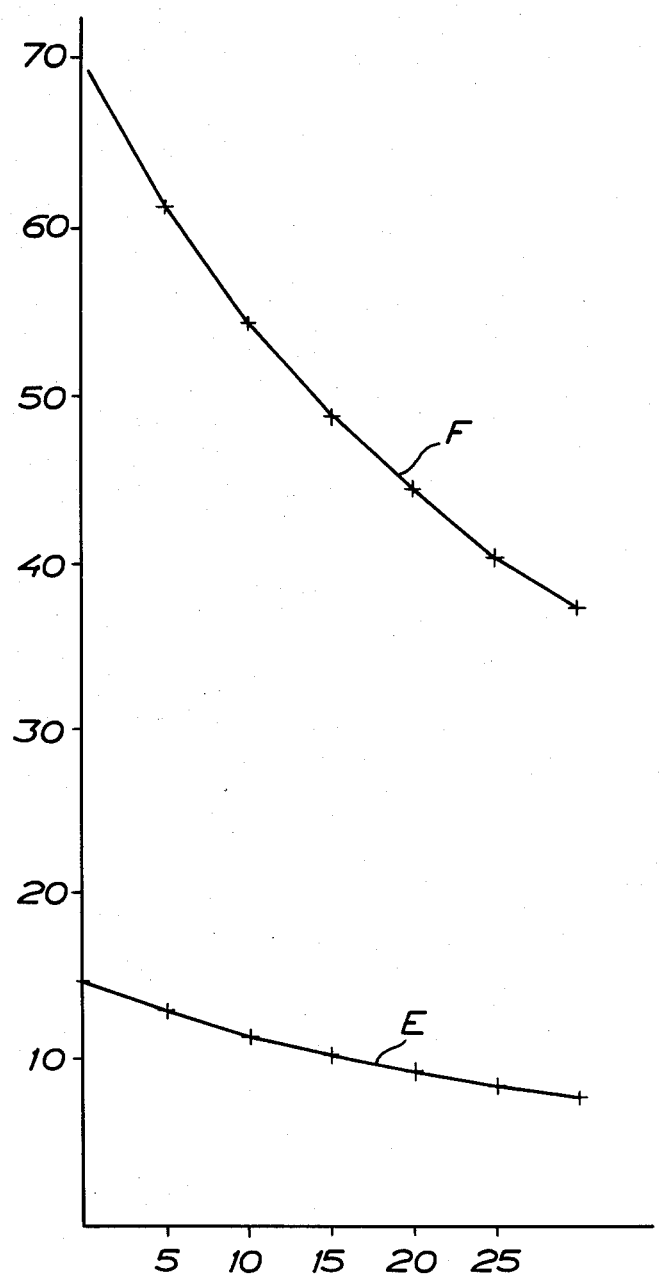

With this object in view, according to the invention the method defined in claim 1 is proposed and in order to explain the invention an embodiment thereof will be described in more detail below with reference to the accompanying drawings in which FIG 1 is a diagrammatic representation of an installation for the cultivation of plants without soil, adapted to use the method according to the invention, FIG. 2 is a graph which shows the content of dissolved oxygen in the nutrient solution, and FIG. 3 is a graph which shows the solubility of atmospheric oxygen or pure oxygen in water.

FIG 1 shows a cultivation bed 10 which comprises a channel 11 in which plants are "planted", the plants being held in position by a root lump of rockwool or a similar inactive substrate while their root system is protected by a cover, an opaque plastics film or the like, which excludes the light from the root system Nutrient solution is supplied to the channel 11 at 12 and this nutrient solution runs through the channel in which the root system of the plants is spreading, to be lead away from the channel at 13 where the nutrient solution can go to an outlet or can again be supplied to the channel at 12 by being caused to circulate in a closed system.

In the present case, such a closed system is assumed to be provided and the nutrient solution leaving the channel 11 is supplied to a supply tank 14 for nutrient solution. From this nutrient solution is drawn by means of a pump 15 to be supplied, via a sand filter 16, to an oxygen supplier 17 which here comprises a container 18 with an inlet 19 for the nutrient solution at the top. This inlet is connected to an admission chamber 20 in the container, which is separated from the rest of the interior of the container by means of a perforated partition 21 having a large number of holes with a diameter of 4 mm. Disposed below the partition or grid 21 is an injection opening 22 for the supply of oxygen from an oxygen flask 23, and at the very bottom of the container there is an outlet 24 leading from the bottom. In the oxygen supplier, gaseous substantially pure oxygen is introduced into the nutrient solution and is dissolved in this. From the outlet, the nutrient solution enriched with oxygen in the oxygen supplier is conveyed to a valve 25 to be supplied in a predetermined quantity to the cultivation bed 10 and otherwise to return to the tank 14.

The closed circulation system for the nutrient solution described naturally also comprises valves and various by-pass and branch pipes in conventional manner, but these details are not shown here. The composition and acidity of the nutrient solution can be regulated in accordance with the method of cultivating plants without soil which is described in the Swedish laid-open specification No. 7510385-3.

In FIG. 2 the horizontal axis indicates the temperature of the nutrient solution in °C. and the vertical axis the amount of dissolved oxygen in the nutrient solution in ppm. A horizontal line A indicates the critical limit for the oxygen content in the nutrient solution which, according to the invention, has been found to be about 4.5 ppm of dissolved oxygen. Below this value, the root respiration is inadequate. The curves B and C indicate the lower and upper limits, respectively, for the values of oxygen contents measured in practice during conventional cultivation of plants without soil, where the only supply of oxygen is obtained by blowing air into the tank in the manner mentioned above The curve D indicates the highest possible value of the oxygen content, the saturation value, with air blown in.

As can be seen from FIG. 2 the capacity of the nutrient solution to hold oxygen dissolved is in inverse proportion to the temperature of the nutrient solution. During warm summer days, the circulating nutrient solution can rapidly come up to temperatures of 26° to 28° C., and it can be seen from FIG. 2 that at this temperature level the nutrient solution can hold at most about 5.5 ppm of dissolved oxygen.

It is therefore an important feature of the method according to the invention that the amount of dissolved oxygen in the nutrient solution should be prevented from dropping below the said critical limit and for this purpose the installation is provided with means for detecting the content of dissolved oxygen in the nutrient solution which is supplied to the channel 11, and to regulate the oxygen content to a value suitable for the plants.

These means comprise a measuring cell 26 of known type in a by-pass from the outlet 24 to the tank 14 to measure the oxygen content in the nutrient solution which leaves the oxygen supplier 17 to be supplied to the cultivation bed 10. The measuring cell 26 is connected to an indicating and control device 27 which indicates the oxygen content measured and is provided with members for adjusting a rated value of the oxygen content. The indicating and control device 27 is coupled to a solenoid valve 28 to regulate the supply of oxygen from the oxygen flask 23 to the oxygen supplier 17, this valve being opened pulsewise depending on the actual value of the oxygen content in the nutrient solution from the oxygen supplier 17 to keep this value in agreement with the preset rated value; a deviation between actual value and rated value leads to an increased pulse frequency with regard to the opening of the solenoid valve 28.

Because the supply of oxygen to the nutrient solution takes place using an oxygen supplier 17, which is a novelty in the cultivation of plants without soil and is based on recognition of the fundamental importance of the supply of oxygen to the root system of the plants for the growth and production of the plants, a large, regulated amount of oxygen—considerably greater than was possible previously—can be absorbed by the circulating nutrient solution as dissolved oxygen. The oxygen content in the nutrient solution naturally drops during the passage of the nutrient solution through the channel 11, but regardless of whether a greater or smaller amount of the dissolved oxygen is consumed during the passage through the channel 11 or whether the nutrient solution has a higher or lower temperature, the described system of supplying oxygen means that the content of dissolved oxygen in the nutrient solution at the root system is kept at a value which is sufficiently far above the critical value of 4.5 ppm to achieve the oxygen-rich milieu for the roots of the plants which is needed in order that the ion exchange and root respiration and hence the absorption of nutrient in the plants may be the most favourable. In order to maintain this oxygen content it is necessary for the nutrient solution which is supplied to the channel 11 to have a considerably greater content of dissolved oxygen than can be supplied simply by blowing in air. In this connection reference should be made to FIG. 3 which shows the solubility of oxygen in water, the horizontal axis indicating the temperature of the water in °C. and the vertical axis indicating the amount of dissolved oxygen in ppm. The curve E relates to the solubility of atmospheric oxygen (20.9% $O_2$) and the curve F to the solubility of pure oxygen (100% $O_2$).

How great the oxygen content should be in the outlet 24 from the oxygen supplier 17 depends on the oxygen content which is present at 13 where the oxygen content should not be lower than 4.5 ppm. The oxygen content at 13 depends on many factors, for example the temperature of the nutrient solution, the root activity of the plants, the kind of plant, the length of the cultivation bed 10, the content of organic material in the nutrient solution and the amount of ammonium nitrate in the nutrient solution. The nutrient solution which leaves the oxygen supplier 17 can, for example at 20° C., be given a content of dissolved oxygen which is as high as about 44 ppm. Here, too, the oxygen content naturally varies in inverse proportion to the temperature of the nutrient solution. The vicious circle with progressive decomposition of the plants because of an increasing lack of oxygen for the root system of the plants can be broken to the advantage of the production.

The purpose of the sand filter 16 is to separate out particles which accompany the nutrient solution leaving the bed 10. Organic particles which are caught in the filter are decomposed more quickly with a high oxygen content in the nutrient solution. As a consequence thereof nutrients bound in these organic particles are returned to the system.

The supply of oxygen also compensates, of course, for an initially low oxygen content in the untreated water which is included in the nutrient solution.

The oxygen supplier described has proved advantageous for the purpose indicated but it is also possible to use oxygen suppliers of another type. What is important is that the oxygen is supplied to the nutrient solution under pressure and that the oxygen is given time to dissolve in the nutrient solution under intensive mixing.

I claim:

1. In a method for the cultivation of plants without soil by supplying an oxygenated nutrient solution to the root system of the plants, the improvement comprising oxygenating the nutrient solution by passing the nutrient solution, before it is supplied to the plants, in finely divided form through an atmosphere of substantially pure gaseous oxygen under pressure, maintaining imminent mixing contact between the solution and the gaseous oxygen sufficient to achieve a dissolved oxygen content of at least 4.5 ppm in the nutrient solution, continuously measuring the dissolved content of the oxygen in the solution following mixing and before circulating the oxygen enriched nutrient solution back to the root system of the plants and adjusting the volume of oxygen supplied to the mixing step depending on the quanity of oxygen measured.

2. The method of claim 1 in which the nutrient solution is recirculated in a closed system, the spent nutrient solution leaving the root system being pumped through the atmosphere of gaseous oxygen.

3. The method of claim 2 in which the spent nutrient solution is filtered before it passes through the oxygen.

* * * * *